United States Patent [19]

Bergamini et al.

[11] Patent Number: 4,895,030
[45] Date of Patent: Jan. 23, 1990

[54] PROCESS FOR THE MEASUREMENT OF WEIGHT FLOW-RATES AND RELATED DEVICES

[75] Inventors: Giorgio Bergamini, Bari; Nicola Campanale, Acquaviva Delle Fonti; Onofrio Cocozza, Bari, all of Italy

[73] Assignee: Nuovo Pignone - Industrie Meccaniche e Fonderia, S.p.A., Italy

[21] Appl. No.: 136,907

[22] Filed: Dec. 22, 1987

[30] Foreign Application Priority Data

Dec. 23, 1986 [IT] Italy ................................. 22813 A86

[51] Int. Cl.$^4$ ............................................... G01F 1/84
[52] U.S. Cl. .................................................. 73/861.38
[58] Field of Search ......................... 73/861.38, 861.37

[56] References Cited

U.S. PATENT DOCUMENTS

Re. 31,450  11/1983  Smith ............................... 73/861.38
4,711,132   12/1987  Dahlin .............................. 73/861.38

Primary Examiner—Herbert Goldstein
Attorney, Agent, or Firm—Morgan & Finnegan

[57] ABSTRACT

A process is disclosed for the measurement of the mass flow-rate of fluid flowing inside a pipe made to oscillate at a certain frequency and at a constant and controlled amplitude by an impulse-generating unit. The process consists of making the pipe constantly oscillate at exactly at its twisting resonance frequency, counteracting the pipe's oscillations with a plurality of brakes, exerting a braking force on the pipe which is proportional to the pipe's shifting speed and which force has an amplitude larger than the amplitude of the Coriolis forces acting on the pipe, detecting the pipe's motion at two points along the pipe symmetrically disposed about its middle and where the greatest twisting deformation occurs, and measuring, after all distrubances have been eliminated, the differences in the amplitude of these two shifts, these differences being directly proportional to the flow-rate.

2 Claims, 6 Drawing Sheets

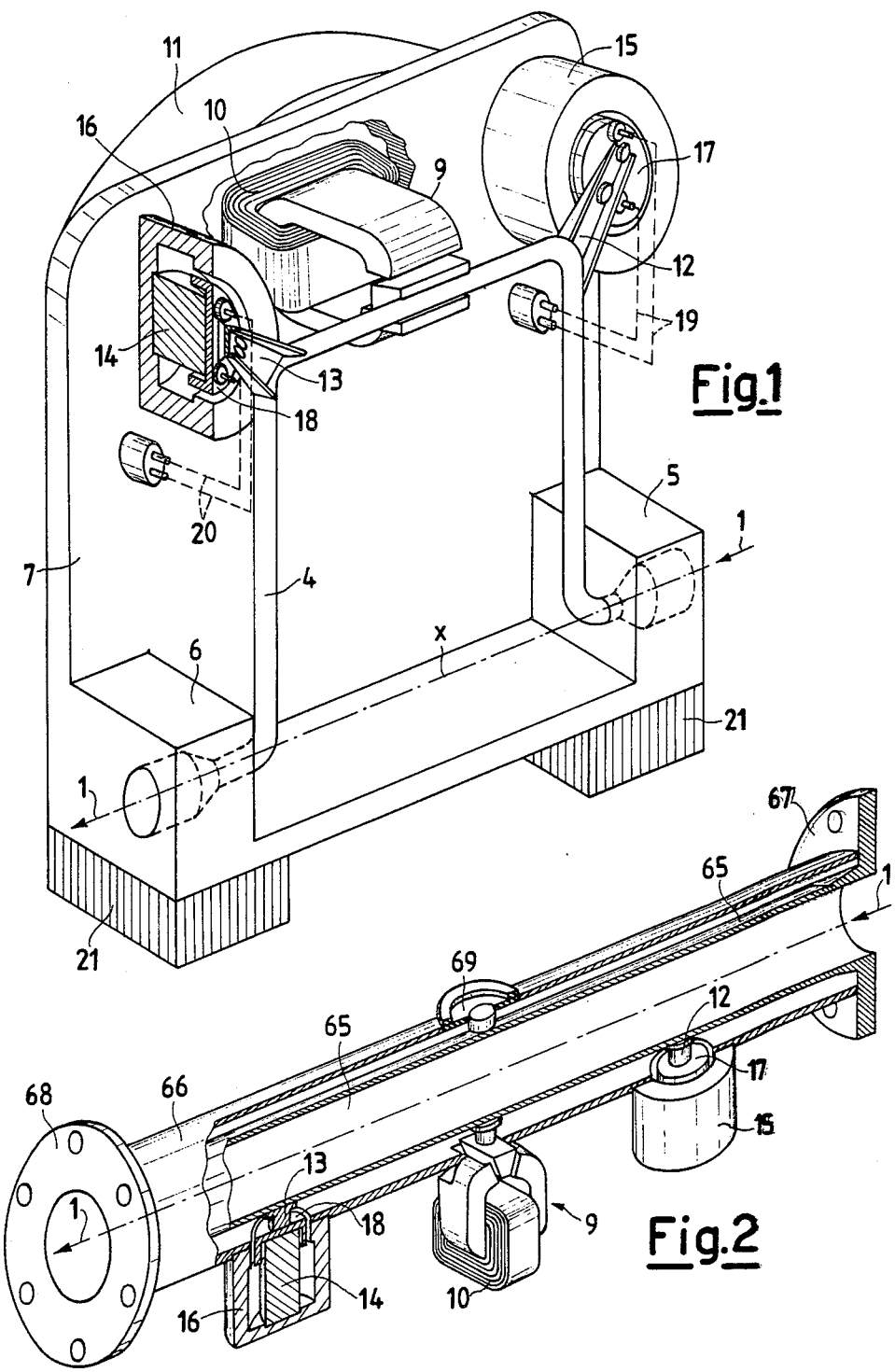

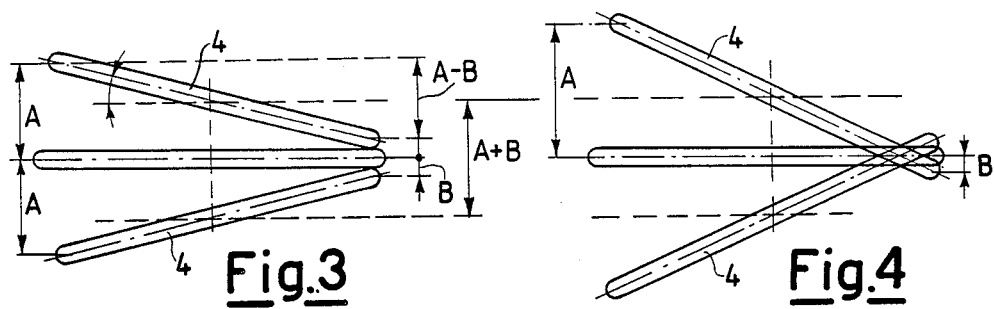
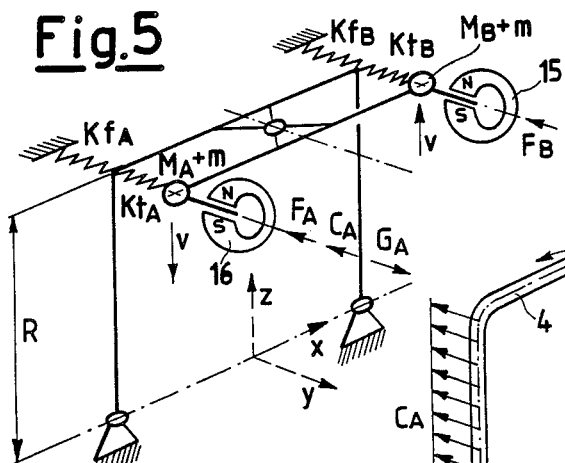
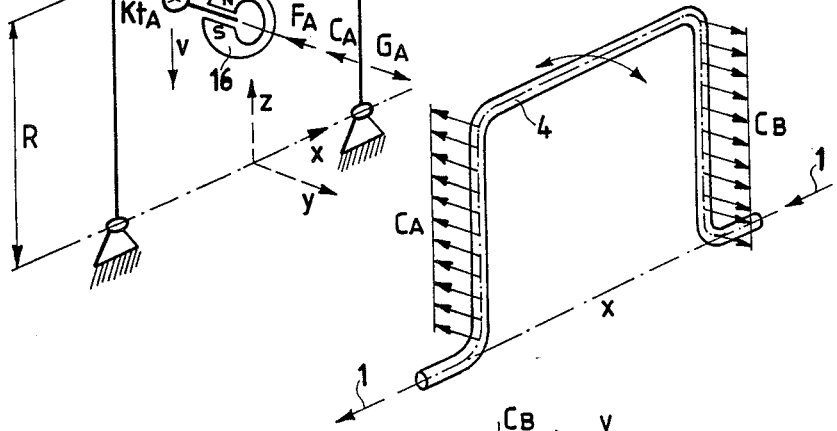
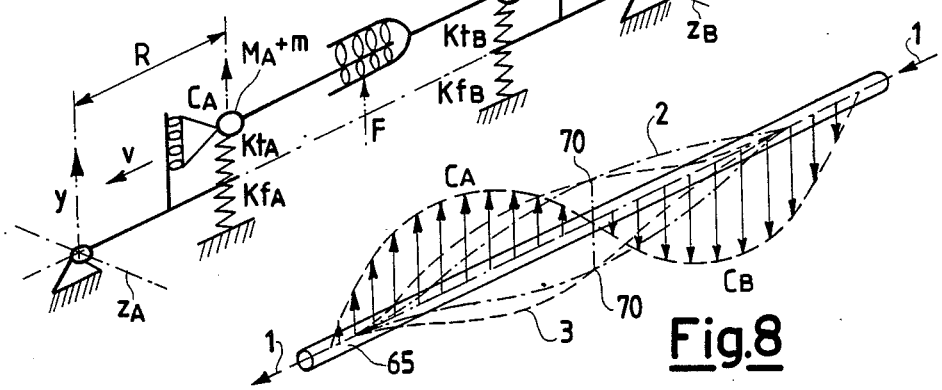

PROCESS FOR THE MEASUREMENT OF WEIGHT FLOW-RATES AND RELATED DEVICES

FIELD OF THE INVENTION

The present invention is concerned with a new measurement process which makes possible the effective, easy and precise measurement of the mass flow-rate of a fluid flowing through an oscillating pipe, even in the case of extremely low flow-rates. These measurements are based upon a linear relationship between the mass flow-rate of a fluid flowing through an oscillating pipe and the oscillations of the ends of this pipe which are caused by the twisting deformation of the tube due to the Coriolis effect. Furthermore, by reducing the necessary amplitude of the pipe's flexural oscillations, the present invention minimizes the mechanical stress undergone by the pipe, while the large magnitude of the induced twisting movements makes the invention particularly insensitive to any seismic disturbances.

The invention is also concerned with the devices for practicing the above said measurement process.

BACKGROUND OF THE INVENTION

The prior art teaches processes and devices for determining the mass flow-rate of a fluid flowing inside a duct or pipe being angularly rotated in a reciprocating manner. The twisting moment generated by the Coriolis forces are then measured. The earliest devices for mass flow-rate measurement based on the measurement of Coriolis forces were of the gyroscopic type.

The first device the present invention can be more directly related to was patented in 1964 by A. J. Sipin (U.S. Pat. No. 3,355,944 issued in 1969), and consists of a "U" shaped pipe which is reciprocated about the axis of the inlet and outlet ends of the pipe. The pipe is provided with strain-gauge type means for measuring the deflections caused by the Coriolis forces.

The aforementioned reciprocating movement is caused by a motor and an electromagnet, and the amplitude of the oscillations is controlled (cfr. claim 5) by controlling the average amplitude of two speed signals obtained from two electromagnetic sensors provided along the sides of the "U". The flow-rate measurement is derived form the difference between these two signals. This patent also claims (see specifically claim 10) that the oscillation frequency is the resonant frequency of the system.

In 1964 the same A. J. Sipin patented (U.S. Pat. No. 3,329,019, issued in 1967) a similar device using completely rectilinear pipe geometry. The device was made to oscillate laterally by the same means, and with the same amplitude control as that in the prior case, i.e., two speed sensors located on opposite sides of the pipe, relative to the middle point of the pipe. This embodiment was also intended to operate at the resonance frequency of the system (see claim 6).

Among the reasons why the foregoing devices did not function in practice are the extremely low values (relative to the impulse forces applied to make the pipes oscillate,) of the Coriolis forces, the relevant deformations, and the frictional forces inherent in the mechanisms and the couplings. Additionally, deriving the flow-rate value from the difference between two speed signals is inexact. In fact, the flow-rate value can only be correctly deduced from the phase difference between the two speed signals whose amplitude remains constant for all normal conditions, except for the very special condition which is the object of the present invention.

At the flexural resonance frequency the flexural impulse force applied to the pipe produces a shift of the pipe in quadrature relative to the same force; on the other hand, the Coriolis force, always in quadrature relative to this flexural shift, produces, in turn, a twisting shift in the tube which is in phase with the same force, and whose oscillation frequency is lower than the twisting resonance frequency, and is therefore in quadrature relative to the twisting shift of the pipe. The end shift of the pipe, which is the vector sum of the two shifts in quadrature relative to each other, will therefore show, relative to the twisting shift of the pipe, a phase difference which must be considered when measuring the mass flow-rate.

In order to avoid the above-said functional limitations, variations were developed which led to the realization of commercial products.

The first patent which supplies a solution for Sipin's concept is the Cox patent (U.S. Pat. No. 4,127,028, issued in 1978), which recognized that the value of the mass flow-rate is related to the phase delay between the two signals obtained from the two sensors, rather than the difference in their amplitude (see FIG. 2 of the Cox patent). Cox also increased the signal/noise ratio by giving the pipe a racket shape so as to decrease its twisting stiffness. This reduced twisting stiffness lowered the twisting resonance frequency until it approached the flexural resonance frequency. Because of this small Coriolis forces could generate large deformations. Cox also coupled two matching pipes which were both parts of a single flow path, and made them vibrate in mutually opposite modes. This prevented vibrations from disturbing the device's supports, reduced the vibration energy, and by doubling the signal's amplitude improved the measuring precision, and rendered the system less sensitive to external vibrations.

A shortcoming of the Cox device is that although by shifting the twisting resonance frequency toward or to the inherent flexural (longitudinal) resonance fequency the system's frequency of oscillation approaches the twisting resonance frequency, an increase in sensitivity can be obtained, but the relationship between the phase displacement angles, and the Coriolis forces will no longer be linear.

Under these conditions, both small Coriolis forces, and small asymmetries cause increasingly large twisting oscillations, the effect of which is to magnify the Coriolis forces. Additionally, equilibrium under resonance conditions is achieved with the dispersion of energy through air friction, which varies as a function of the shifts according to a square law, and also through mechanical pipe deformation in hysteresis cycles, which makes fatigue breakage possible.

Beside the present non-linearity under conditions of twisting resonance, a phase shift also occurs between the motion and the generation of Coriolis forces. In fact, the twisting deformations caused by the Coriolis forces, which themselves are in phase with these forces, shift in phase to reach a phase advance of 90°. Thus, the amplitudes of the two signals become different, and their phase delay decreases down to zero. Inasmuch as Cox uses for his signal the phase difference between the two equal amplitude movements of the position sensors installed on the pipes, (FIG. 2 of the patent,) it is clear that Cox' device will vibrate at frequencies which are relatively far from the device's twisting resonance frequency, and therefore cannot take advantage of extremely high amplification possible when operating at the twisting resonance frequency.

Another practical embodiment disclosed in U.S. Pat. No. 4,187,721, issued in 1980 to James E. Smith, improves the invention disclosed by Sipin.

In his patent, Smith recognizes the desirability of making a U-shaped pipe operate exactly and only at the flexural resonance frequency, since at this frequency the driving force needed to oscillate the pipe is small and will not interfere with the extremely small Coriolis forces. Furthermore, Smith, states that the flexural resonance frequency must be lower than the twisting resonance frequency in order to prevent the aforementioned operating anomalies, described above in connection with the Cox patent, from occuring.

With the improvement disclosed by Smith the measured signal becomes a highly linear function of the flow-rate, but another limitation remains. The signals which have to be processed are of infinitesimal magnitude, and to process them requires extremely sophisticated electronics. There are related problems with the stability of measured values for very low flow-rates, and with seismic-type disturbances.

OBJECTS OF THE INVENTION

The present invention is intended to eliminate these drawbacks by providing a process and apparatus which makes it possible to effectively measure mass flow-rates through the effects of Coriolis forces. This technique is more effectively exploited by making the system oscillate at exactly its twisting resonance frequency, which produces very strong signals, without having this frequency coincide with the system's flexural oscillation frequency.

The novel process, because of the strong signal which results when the pipe is forced to flexurally oscillate at a frequency equal to its twisting frequency, substantially improves performance, particularly at low flow-rates. It also reduces the flow-meter's sensitivity to seismic disturbances without requiring the expensive doubling of the oscillating pipes as taught by the prior art, and it makes practical, even in the case of medium and large flow-rates, the use of rectilinear pipes like those disclosed by Sipin. Another advantage is achieved by making this pipe oscillate at a frequency coinciding with the second harmonic; the mass flow-rate of fluid flowing inside the pipe becomes linearly proportional to the amplitude of the pipe's twisting shifts. In fact, at the twisting resonance frequency the flexural impulse force applied to the tube produces a flexural shift of the same pipe, which has a phase difference of 180° (in opposition) relative to the above-said force; however, the Coriolis force, always in quadrature relative to the flexural shift, produces a twisting shift of the pipe, which, when the system vibrates at its twisting resonance frequency, is in quadrature relative to the same force, and hence is in phase with the flexural shift. The resulting end shift of the pipe is still the vector sum of the above-said two shifts which, because they are in phase, are simply added to each other. Hence, the difference between this latter shift and the flexural shift supplies a measure for the twisting shift, which is linearly proportional to the mass flow-rate being measured.

Because the twisting shift of the pipe is in quadrature relative to the Coriolis forces, it follows that the twisting shift will reach its maximum when the Coriolis forces are zero, and vice-versa, and it will reach a maximum at the limits of the flexural shift and zero at the center thereof, as shown in FIG. 3. The result is that a shift A will occur at one end which is larger than the shift B at the other end, viz., Coriolis forces will arise which are larger at A (fluid outlet) and smaller at B (fluid inlet). Indeed, the above-mentioned calculation for determining the value of the mass flow-rate is actually recalculated as the difference, A−B, in amplitude of the oscillations of the two vertices of a "U"-shaped pipe, or of the two sides of a rectilinear pipe, measured at two intermediate points between the middle and the two ends of the same pipe.

As will be discussed below, the foregoing is achieved not only by using an impulse force generating magnet to force the pipe to oscillate at its twisting resonance frequency, but also by using two magnetic brakes with differentiated braking effects proportional to the oscillation speed of the pipe and of magnitudes at least equal to that of the Coriolis forces. These brakes allow the generation of a signal of the same type, and of the same phase, as the Coriolis forces. This allows the pipe to oscillate in a twisting mode even when the mass flow-rate is zero, and hence the Coriolis forces are zero. Automatic circuitry performs a search for the proper frequency peak to operate at even for zero mass flow rate values. It also prevents the amplitude of the twisting shift, which increases due to resonance, from exceeding the limiting value consistent with proper operation, i.e., that prevents crossing movements from occurring when the motion of B reverses relative to A, as shown in FIG. 4. Another requirement of the instant invention, which is designed so that the (A−B) amplitude of the twisting deformation of the oscillating pipe and the mass flow-rate are directly proportional to one another, is that the amplitude (A+B) of the flexural oscillation of the pipe is always controlled, and (see FIG. 3), the shifts of A and B amplitude will always be in phase relative to one another. This occurs only when there is perfect twisting resonance and requires there be neither mechanical misalignments, asymmetries in the elastic characteristics of the pipe, nor uneven application of the impulse force.

A primary problem consists of making the pipe vibrate in its flexural mode at a frequency different from its spontaneous resonance frequency, while exactly maintaining the vibration frequency at the twisting resonance frequency.

This problem is solved by using an electronic circuit which searches for and maintains the twisting frequency which maximizes the amplitude of the measurement signal (A−B). This circuit determines the proper frequency by raising in successive steps, the frequency of the impulse force applied to the pipe, to find the flexural oscillation frequency which produces the greatest twisting oscillations, and hence, the highest (A−B) value.

In a variation of the present invention the foregoing circuitry makes it possible to determine and maintain the twisting resonance frequency even in the presence of variable flow-rates.

Other electronic circuits are provided in the present invention which filter the signals corresponding to (A+B) and (A−B) quantities in a novel way. This filtering is necessary to remove noise and spurious harmonics so that only the components which are in perfect quadrature with the Coriolis forces (and therefore surely in phase with one another) are retained, all of which helps to keep the (A+B) amplitude of the flexural oscillation constant, and also compensates for the brakes' differential action so that a zero output signal is achieved when the flow-rate is zero.

A further advantage of the present invention is that the measurement system is isolated from seismic disturbances with a considerable cost savings, and without the usual complications accompanying using duplicate pipe structures. This is done by mounting the device on an elastic support which enables it to oscillate in phase opposition relative to the pipe oscillation, and hence it will not interact with the support plane.

The conditions needed for correct operation of the measuring instrument were determined based on a precise mathematical analysis of the behaviour of a pipe oscillating at its twisting resonance frequency.

In order to simplify the analysis, the oscillating system has been reduced to only two models (see FIGS. 5 and 7). In the case of a "U"-shaped pipe (see FIG. 6) the model identifies the flexural and twisting modes of movement. In the case of a rectilinear pipe (see FIG. 8), the model identifies the oscillations relevant to the first and second harmonics. Masses $M_A$ and $M_B$ are treated as two point masses (see FIGS. 5 and 7), and only the motion of these two points is analyzed. These masses $M_A$ and $M_B$ represent the mass of the pipe and the rigid components connected to it which apply the impulse force to oscillate the pipe, which brake the pipe's motion, and which monitor the motion. Mass m represents the effective value, referred to the considered point, of the mass of fluid flowing through the pipe in the direction of arrows 1 (see FIGS. 6 and 8). Coriolis forces are represented as $C_A$ and $C_B$.

Also introduced for the two points taken into consideration are flexural elastic constants $K_{fA}$ and $K_{fB}$ and twisting elastic constants $K_{tA}$ and $K_{tB}$. $K_{fA}$ and $K_{fB}$ relate to the flexural motion, while $K_{tA}$ and $K_{tB}$ relate to the twisting motion. Forces $F_A$ and $F_B$ are also considered as separately applied to these two points, and these forces cause the system to oscillate. In reality these forces can be replaced a single force F applied at the pipe's center of symmetry. Finally, the viscous and aerodynamic behavior of these two points are modeled by having two viscous forces proportional to the points' speeds multiplied by the brake dampening coefficients, ($G_A$ and $G_B$, respectively) and two aerodynamic forces proportional to the square of the points' speeds multiplied by the coefficient of aerodynamic resistance ($C_{dA} = C_{dB} = C_{dC}$,). Because the pipe movements are of very low magnitude the losses due to hysteresis in the piping material or any dynamic effects caused by the vortices induced in the fluid flowing through the pipes have been ignored.

The flexural movement in the "U"-shaped pipe (see FIG. 5) has been simplified and only rotation around the X axis is considered. The rectilinear pipe's behavior is modeled by means of hinges, sliders and slides (see FIG. 7), and in fact the same elements, constants, and, hence, the same relationships which describe the motion of the "U"-shaped pipe apply. Flexural movements of masses M+m are modeled as revolutions around the two axes ($Z_A$ and $Z_B$) passing through the end hinges. In both situations (the "U" shaped pipe and the rectilinear pipe,) the motion of the two point masses taken into consideration is always in the Y direction.

We also specify that the maximum shift of mass $M_A+m$ relative to the rest position is "A", while the maximum shift for $M_B+m$ relative to the rest position is "B" (see FIG. 3). To further simplify matters, the impulse force applied to the system is represented either by two sinusoidally applied forces, $F_A$ and $F_B$, or by a single force F applied to the center of symmetry and wherein $$F = F_0 \cdot \sin wt.$$

Although from a practical standpoint waveforms other than sinusoids might perform acceptably, these waveforms have the disadvantage of containing higher harmonics which would undesirably complicate the motion of the pipe model.

The equations of motion which describe the equilibrium between the excitation forces $F_A$ and $F_B$ and the system's inertial, viscous, Coriolis, aerodynamic and elastic behavior (the viscous force being due to the magnetic brakes) are:

$$F_A = -Y_A(M + m) - Y_A(G-) + 2mV\frac{Y_A}{R} - \quad (1)$$

$$Y_A^2 C_d - Y_A K$$

$$F_B = -Y_B(M + m) - Y_B(G+) - 2mV\frac{Y_B}{R} - \quad (2)$$

$$Y_B^2 C_d - Y_B K$$

wherein:

G represents the average value of the magnetic brakes' damping coefficients, viz.

$$(G_A + G_B)/2.$$

Δ represents their half-difference, i.e., the value:

$$(G_B - G_A)/2$$

so that the term (G−Δ) is equal to $G_A$, and (G+Δ) is equal to $G_B$. The two dampening coefficients $G_A$ and $G_B$ have different values; the larger coefficient ($G_B$) corresponds to the fluid input side of the pipe, and the smaller coefficient ($G_A$) corresponds to the fluid output side of the pipe. These unequal braking coefficients mean the brakes generate unequal forces in phase with the Coriolis forces; and the torque produced by these unequal forces has the same effect as that of a flow rate;

R represents mass m's radius of rotation (see FIGS. 5 and 7);

V represents fluid particle m's flow speed through the pipe;

K represents the total elastic constant.

The term $$2 mV \frac{\dot{Y}}{R}$$

indicates the Coriolis forces $C_A$ and $C_B$, wherein $\dot{Y}/R$ represents the angular speed of the point under consideration, and mV is a term proportional to the mass flow rate of fluid flowing inside the pipe.

In the order to identify the forces which generate the pipe's twisting motion, it is advantageous to decompose each motion into its respective flexural and twisting components, viz.:

$$Y_A = \frac{Y_A + Y_B}{2} + \frac{Y_A - Y_B}{2}$$

$$Y_B = \frac{Y_A + Y_B}{2} + \frac{Y_A - Y_B}{2}$$

By also decomposing the elastic reactions into their two components, we obtain:

$$Y_A K = \left( \frac{Y_A + Y_B}{2} K_{fA} + \frac{Y_A - Y_B}{2} K_{tA} \right) \quad (3)$$

$$Y_B K = \left( \frac{Y_A + Y_B}{2} K_{fA} + \frac{Y_A - Y_B}{2} K_{tA} \right) \quad (4)$$

By subtracting equation (2) from equation (1), introducing equations (3) and (4), and imposing the conditions that $$K_{fA} = K_{fB}$$

and $$K_{tA} = K_{tB} = K_t,$$

we obtain a relationship between the forces which produce the twisting motion, while the terms which describe equal, in-phase forces disappear, and which hence describe the flexural motion:

$$O = -(M + m)(\ddot{Y}_A - \ddot{Y}_B) - G(\dot{Y}_A - \dot{Y}_B) + \quad (5)$$

$$\Delta(\dot{Y}_A + \dot{Y}_B) + \frac{2mV}{R}(\dot{Y}_A + \dot{Y}_B) -$$

$$-C_d(\dot{Y}_A^2 - \dot{Y}_B^2) - K_t(Y_A - Y_B)$$

Under these conditions it is possible to deduce that the resulting motion is sinusoidal and can be described as $$Y_A = A \sin wt$$

$$Y_B = B \sin (wt + \psi),$$

wherein $v$ is the phase delay between the two movements.

This phase delay $v$ is the basis for all of the instruments which up to now are used to measure mass flow rates. All these devices have operated with a flexural vibration frequency centered on the first flexural resonant. Under those conditions, if the system is mechanically symmetrical, the angle $v$, even when extremely small, will be perfectly linear with the mass flow rate of the flowing fluid, while the amplitudes A and B of the two movements are equal. However, in the present case the angle $v$ is assumed to remain zero for varying flow rates and therefore:

$$Y_A = A \sin wt \quad (6)$$
$$Y_B = B \sin wt$$

Consequently, the speeds and accelerations of the two points will be, respectively:

$$\dot{Y}_A = A w \cos wt \quad \ddot{Y}_A = -A w^2 \sin wt \quad (7)$$

$$\dot{Y}_B = B w \cos wt \quad \ddot{Y}_B = -B w^2 \sin wt$$

Substituting equations (6) and (7) into equation (5), we find:

$$O = (M + m)(A - B) w^2 \sin wt - G(A + B) w \cos wt -$$

$$-\Delta(A + B) w \cos wt + \frac{2mV}{R}(A + B) w \cos wt -$$

$$-C_d(A + B)(A - B) w^2 \cos^2 wt - K_t(A - B) \sin wt.$$

After rearranging to find $(A - B)$, $$A - B = \quad (8)$$

$$\frac{(A + B)(2mV/R + \Delta)}{G + [K_t - w^2(M + m)] (\tan wt)/w + (A + B)C_d w^2 \cos^2 wt}$$

If we also assume that the braking effect G of the magnetic brakes is considerably larger than the aerodynamic friction forces, these friction forces can be regarded as negligible (also due to the fact that the flexural movement has a very small amplitude (A+B),) and equation (8) becomes:

$$A - B = \frac{(A + B)(HQ + \Delta)}{G + [K_t - w^2(M + m)] (\tan wt)/w} \quad (9)$$

wherein the mass flow rate Q has been introduced, which is linearly proportional, according to the constant H, to the Coriolis term 2 mV/R.

We observe now that if the system is made to oscillate at its twisting resonance frequency, which is equal to $$w = \sqrt{\frac{K_t}{M + m}}$$

the second term appearing in the denominator of equation (9) also becomes zero, and equation 9 is reduced to:

$$A - B = \frac{(A + B)(HQ + \Delta)}{G}. \quad (10)$$

From equation (10) we observe that a linear proportionality exists between the mass flow rate Q of fluid flowing through the oscillating system and the amplitude of the twisting oscillations (A−B), subject to the requirement that the amplitude of the flexural oscillations (A+B) be kept constant so its value can be measured and entered in the computation.

From this equation, we can also conclude that as G grows smaller the twisting shift (A−B) will grow larger, as will the effect of the Coriolis forces. It must be kept in mind that G cannot become too small, because then (A−B) would grow too large, and the undesirable crossing motion would occur wherein there is a reversal of the motion of B relative to A. This phenomenon has already been mentioned and illustrated in FIG. 4. It is undesirable because there is a consequent loss of linearity between the mass flow rate and the twisting shift. Inasmuch as this reversal begins when twisting shift B becomes zero, i.e., when $$\frac{A-B}{A+B} = 1,$$

the condition which must be fulfilled is that:

$$\frac{A-B}{A+B} < 1,$$

and, consequently, from (10) we find that:

$$\frac{A-B}{A+B} = \frac{HQ + \Delta}{G} < 1$$

from which follows:

G>HQ+Δ i.e., the system is linear only if the magnetic brakes generate forces are larger than those forces generated by the Coriolis effect.

To summarize the foregoing discussion, a linear proportionality is obtained between the amplitude of the twisting oscillations (A−B) and the mass flow rate Q, so that this latter quantity can be determined simply by measuring the shifts of the two points on the pipe being studied, provided, of course, that the various underlying assumptions are fulfilled, namely, that asymmetries do not exist in any mechanical characteristics (unequal masses), system elastic characteristics ($K_f$ and $K_t$) or in the application of the impulse force(s), which, by generating disturbances in quadrature relative to the Coriolis forces, would tend to displace the phase of the two shift signals A and B thereby reducing the linearity of the measurement system. The impulse forces should be sinusoidal, in phase with one another ($\nu=0$), and lack spurious harmonics. If this is the case the two resulting shift signals A and B will be in phase with one another, lack spurious harmonics, and the oscillation frequency will be exactly equal to the twisting resonance frequency of the system. The amplitude of the flexural oscillations (A+B) should remain constant, and the oscillating motion should be counteracted by brakes applying different braking forces. Finally, the combined braking forces should be significantly larger than those caused by the Coriolis effect.

In an alternative embodiment of the invention, instead of measuring the shifts of the pipe, using, for example, two Hall probes at the two points under consideration, the speeds of those two points can be measured with two speed sensors. This alternative technique succeeds inasmuch as the differential variable of the two signals simply becomes proportional to w(A−B), while an automatic control system keeps the sum of the two signals constant, thereby also keeping the value of w(A+B) constant. Hence, equation (10) remains valid, although now the equation is expressed in the form:

$$w(A-B) = \frac{(A+B)(HQ + \Delta)}{G}.$$

Among the reasons for using speed sensors are the ease with which these sensors can be incorporated into the brake mechanisms, and the advantage that although the automatic control system which keeps the w(A+B) product constant may be substantially the same as a system which controls only the amplitude (A+B), the system will render the values of the Coriolis forces independent of variations in w, as may occur when a change in temperature causes a change in the elastic constant $K_t$ of the metal of the pipe $$\left( w = \sqrt{\frac{K_t}{M+m}} \right).$$

This helps reduce the effect of thermal disturbances which, because HQ remains constant, makes it desirable that Δ and G not vary with changing temperatures.

The invention is more fully explained with reference to the drawings attached hereto. These figures display preferred embodiments of the invention, but are included only to better illustrate, without limitation, the invention. Structural, functional and operational variations can be made without departing from the scope of the present invention.

BRIEF DESCRIPTION OF THE DRAWINGS

FIG. 1 is a partially sectioned perspective view of a mass flow rate meter having a "U" shaped pipe which operates according to the teachings of the present invention;

FIG. 2 shows a partially sectioned perspective view of a flowmeter having a rectilinear pipe which operates according to the teachings of the present invention;

FIG. 3 is a diagram illustrating the flexural and twisting shifts of the pipe used in the present invention;

FIG. 4 is a diagram showing the crossing movements of the ends of the pipe caused by excessive twisting movements;

FIG. 5 shows the mechanical model employed for the mathematical analysis of the behaviour of a "U" shaped pipe oscillating at its twisting resonance frequency;

FIG. 6 shows the Coriolis forces $C_A$ and $C_B$ acting on the two sides of the oscillating "U" shaped pipe depicted at a single instant;

FIG. 7 shows the mechanical model employed for the mathematical analysis of the behavior of a rectilinear pipe oscillating at its twisting resonance frequency.

FIG. 8 shows the Coriolis forces $C_A$ and $C_B$, as well as the oscillations corresponding to the first and second harmonics of the rectilinear pipe;

DESCRIPTION OF THE PREFERRED EMBODIMENTS

Figure 10:
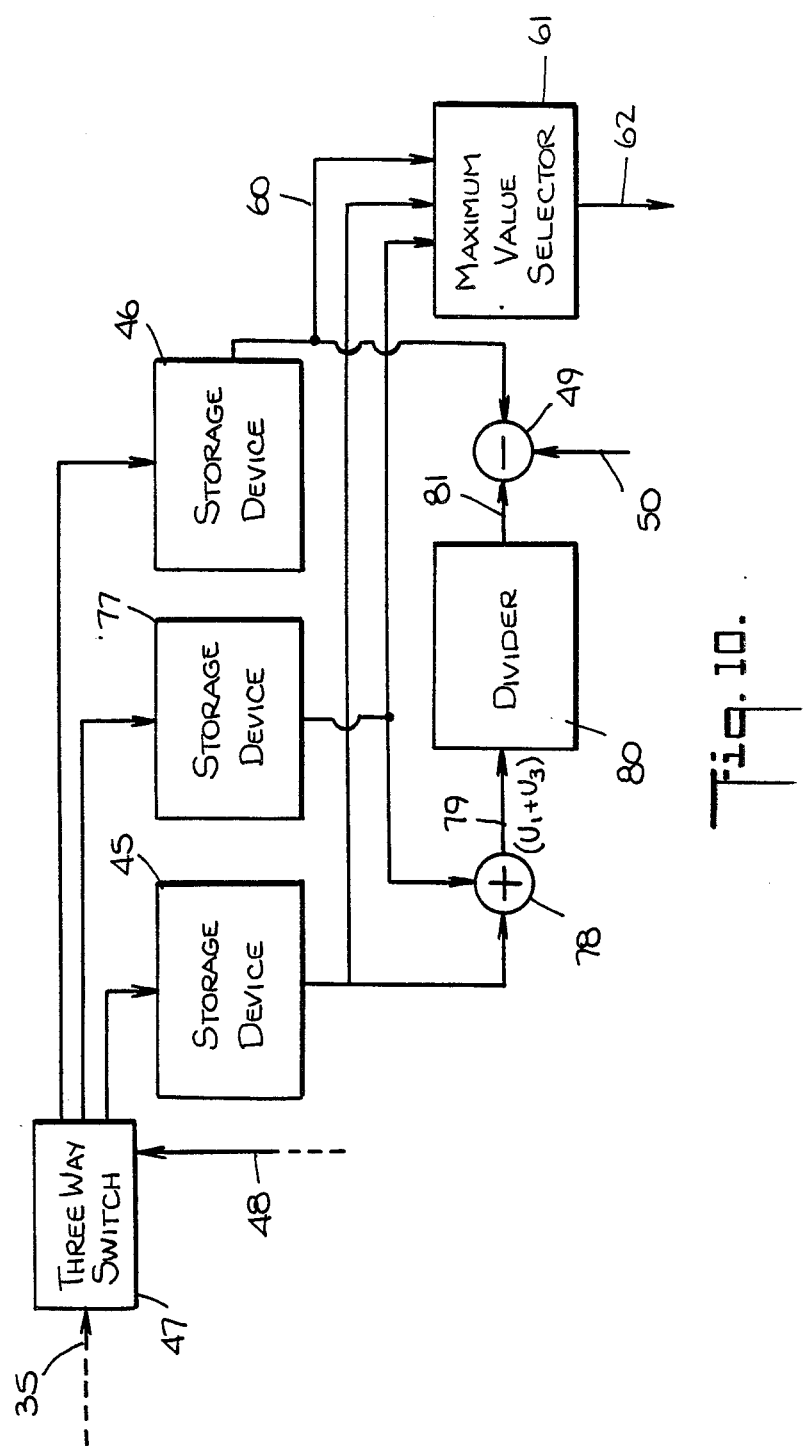
FIG. 10 shows a variation of the block diagram of FIG. 9 which makes allowance for possible variations in the flow rate.

Referring to the Figures, corresponding elements are indicated by the same reference numerals. A "U"-shaped pipe 4 is rigidly fastened to and with its two ends inside shoulders 5 and 6 of rigid support 7, through which the fluid whose mass flow rate is to be measured flows in the direction of arrows 1.

Pipe 4 is made to oscillate around axis X by electromagnet 9. The excitation coil 10 of electromagnet 9 is fed a known voltage having a known frequency. More specifically, this is the twisting resonance frequency of the system. This current is applied by the circuit system shown in FIG. 9, and which is contained inside the box 11 fastened to the corners of the "U" 4. The movable coils 14 of two electromagnetic brakes, 15 and 16 are likewise fastened to the corners of the "U". The two electromagnetic brakes are themselves fastened to support 7.

Speed sensors or Hall probes 17 and 18 are attached to measure the shifts of the corners of the "U" 4. These measured values correspond to the aforementioned quantities A and B, whose values are sent through leads 19 and 20 to the inputs of the system of FIG. 9. The two electromagnetic brakes 15 and 16 exert unequal braking forces, the stronger braking effect being generated by the brake 15 provided at the inlet side of the pipe. This is done to create a false Coriolis effect which twists the pipe even in the absence of fluid flow. Finally, the entire flowmeter is mounted on elastic supports 21 which isolate it from seismic disturbances.

It is not critical, in the present invention, whether the pipe used in the mass flowmeter is "U" shaped or rectilinear. Transmitted signals A and B can be either position or speed signals. Once they are detected by sensors 17 and 18 and amplified by amplifiers 22 and 23 (see FIG. 9), signals A and B are then subtracted from one another in node 24 to produce at output 26, a signal corresponding to the quantity (A−B) and are added to one another in node 25 to produce at output 27, a signal corresponding to the quantity (A+B).

The two signals f(A−B) and f(A+B) are not perfectly sinusoidal. They must therefore be filtered to remove the spurious harmonics, leaving only the components which are in perfect quadrature relative to the Coriolis forces. This is necessary because it is virtually impossible to maintain perfect mechanical alignment in the flowmeter. Alignment is lost over time because of asymmetrical fouling of the pipe and disordered, random vibrations.

This signal processing accomplished according to the present invention by means of a novel and simple filter based on Fourier transforms.

It is well understood that when a sinusoidal signal whose phase and frequency are both known is perturbed by overlapping noises having frequencies which are multiples of the desired signal, this latter can be isolated and extracted by simply computing the Fourier coefficient relevant to the sought frequency, viz.:

$$A - B = \int_0^{nT} f(A - B) \cdot \cos(2\pi t/T) \cdot dt \quad (11)$$

wherein T is the period referred to the frequency of forced oscillation of the pipe, and n represents the number of oscillations during which the integration of the initial signal f(A−B) is carried out.

Unfortunately, although the practical embodiment of (11) makes possible an insensitivity to phase displacements and to the presence of higher harmonic oscillations, it gives results which are highly complex and therefore are expensive to use, regardless of whether analog or digital signal processing is used.

The present invention overcomes this problem by replacing equation (11) with an approximate relationship. More specifically, in equation (11) the function cos ($2\pi \cdot t/T$) is discretized and computed for time intervals $\Delta t = T/6$, so that it becomes cos($i \cdot \pi/3$), wherein the index number i has values within the range of 0 to (6n−1), thereby covering the entire time of integration, nT. Since the values which the cosine function assumes are constant, they can be taken out of the integral, and equation (11) becomes:

$$(A - B) = \sum_{i=0}^{6n-1} \cos(i \cdot \pi/3) \cdot 1/4T \int_{i \cdot T/6}^{(i+1) \cdot T/6} f(A - B) \cdot dt \quad (12)$$

wherein there is summation of a set of integrals each over a range of T/6 (in fact, when the index i becomes (6n−1), the upper integration limit (i+1)·T/6 of equation (12) becomes equal to nT of equation (11)).

It is clear that this discretization is less accurate than the integral, but by increasing the number of integration periods n, it is possible to reduce this inaccuracy and obtain quite acceptable results.

Figure 11:
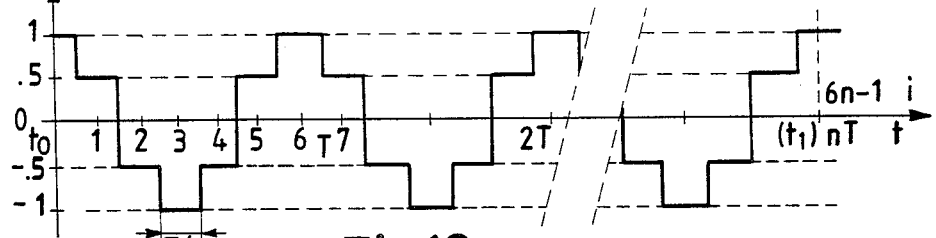
FIG. 11 shows the behaviour over time of the function cos (i·π/3), discretized according to the invention by the function cos (2πt/T)

Summarizing, equation (12) is an approximate relationship, wherein for a single integration of the product of two variable functions, the summation was replaced by a set of integrations of a single function, which is multiplied by the constant values which the cosine function assumes every $\pi/3$rd of a period. The cyclic sequence of these values with increasing i values is: 1; 0.5; −0.5; −1; −0.5; 0.5, as shown by the broken line in FIG. 11.

In practice, the filter includes an analog integrator 28 (see FIG. 9), to whose input the signal f(A−B) available at 26 is sent. After this it is cyclically multiplied, in block 29, by the values of the above cited sequence, under the command, through connection 30, of a sequencer 31 which itself receives the basic synchronization for all of the operations carried out by the system from a voltage-frequency converter 32 through connection 33 and defines, through the connection 34, the number oscillations n at the end of which the integration in 28 is terminated.

At the end of each integration step, during the time interval, e.g., of from $t_0$ to $t_1$, an integrated signal is obtained at output 35 of integrator 29. This signal, "U", represents the average value of the quantity (A−B) during the time period taken into consideration (see the first chart in FIG. 13). This is not however, the mass flow rate; that value is obtained at the system's specific twisting resonance frequency. In fact, during the search for this resonance frequency there will be changes in U.

A similar filtering scheme is also envisaged for the signal f(A+B). The signal is available at output 27, and it is multiplied in block 36 by the values of the sequence already preset and cyclically made available on command by the sequencer 31 through the connection 37. This value is then integrated in an integrator 38 over the time relating to the n oscillations preset by the same sequencer 31 through the connection 39.

The signal, filtered and proportional to the amplitude (A+B) of the flexural oscillation of the pipe, is available at the outlet 40 of the integrator 38. This signal is then compared to a set signal, preset through the generator 41, in a PID regulator, 42, which thus supplies, at its output 43, a pulsating command signal whose frequency is imposed by the voltage-frequency converter 32 and whose amplitude modulates through the amplifier 44 the impulse energy to be supplied to the excitation coil 10 of the impulse force generating electromagnet 9, so as to keep constant the amplitude (A+B) of the flexural motion of the vibrating system.

According to the present invention the search for the system's twisting resonance frequency is made to substantially coincide with the search for the frequency which maximizes the amplitude (A−B) of the pipe's twisting oscillations and therefore, summarizing, with the search for the frequency which maximizes the U signal available at the output 35 of the integrator 28.

Figure 12:
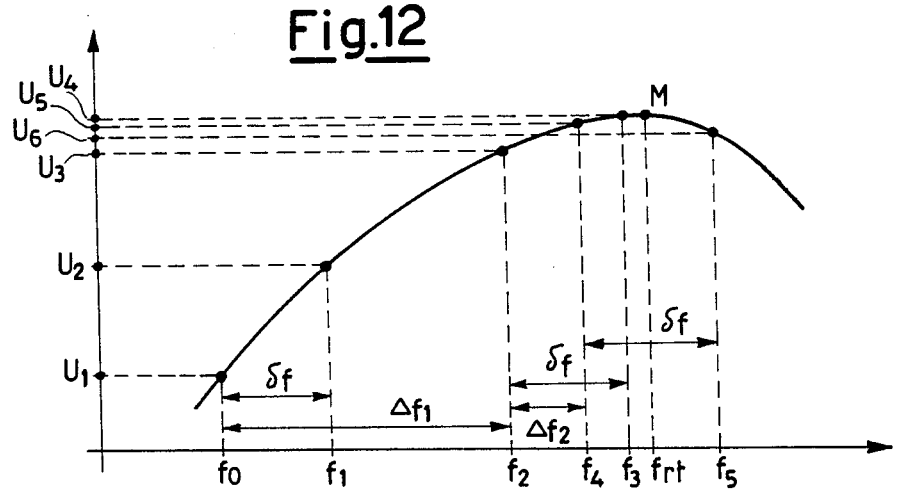
FIG. 12 is a chart showing the correlation curve between the integrated quantity U and the frequency of oscillation f for a constant flow rate, as well as the frequency increases which must be applied when searching to find the twisting resonance frequency.

The curve shown in FIG. 12 represents the behavior, for constant flow rate, of signal U with varying oscillation frequency f. This curve shows a maximim peak corresponding to the twisting resonance frequency $f_{rt}$.

In reality the resonance peak is not shaped quite like the peak shown in FIG. 12, but is actually sharper than that. Because the actual peak is sharper, a slight deviation from the twisting resonance frequency would cause large variations in U, and, consequently, large errors in the measurement of the flow rate. It is therefore necessary that the frequency always be stabilized at the value for twisting resonance. This search for the maximum peak is implemented by periodically making small constant variations of size $\delta f$ in the impulses force generating frequency and then measuring the changes $\Delta U$ caused by these variations. It is possible to detect the tangent $\Delta U/\delta f$ for the signal amplitude-frequency curve. Based on the sign and value of this tangent the frequency of oscillation may be changed by a value $\Delta f$ which is proportional to the value of tangent $\Delta U/\delta f$. More specifically, the impulse force generating frequency is increased every second period by a constant value $\delta f$, whose behaviour with time is shown by the broken line shown in the second chart from the top of FIG. 13. The results U of two successive integrations carried out by integrator 28 are then loaded into two storage devices 45 and 46, which are alternatively enabled to effect this storage by switch 47 governed by the sequencer 31 through connection 48.

Figure 13:
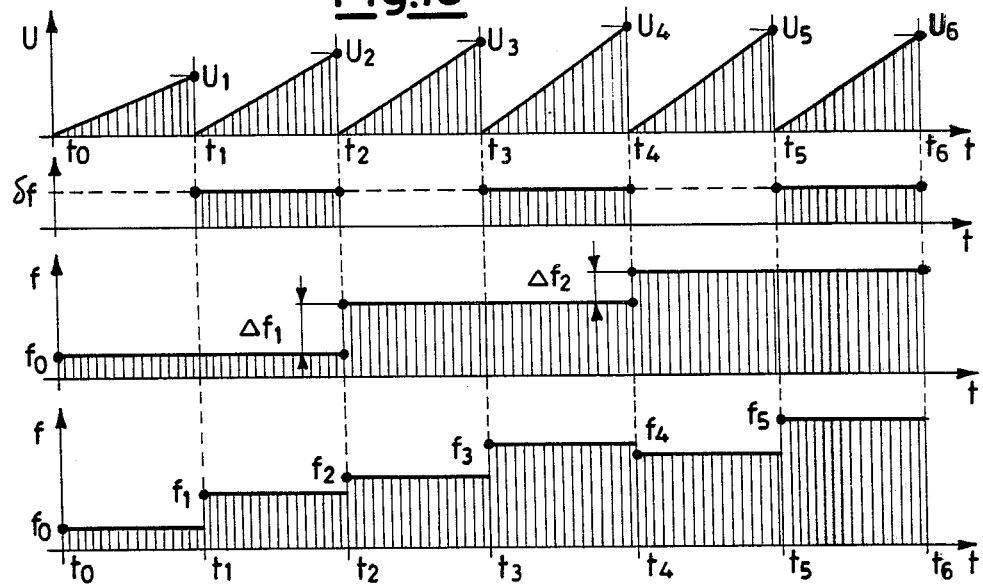
FIG. 13 is a chart showing the behaviour over time of the various parameters necessary when searching for the twisting resonance frequency, provided the flow rate is constant. These various parameters are correlated with one another.

At the end of time $t_1$ (see FIGS. 12 and 13), integrator 28 supplies signal $U_1$ to output 35, this corresponding to the value of (A−B) which is obtained when the oscillation frequency is $f_0$. The signal is loaded into the storage via switch 47, upon command by sequencer 31. During the following time period, until $t_2$, the oscillation frequency is increased by $\delta f$ to $f_1$. The corresponding integrated value $U_2$ is loaded on command by sequencer 31 to the other storage device 46. The contents of the storage devices 45 and 46 are subtracted from each other in the node 49, producing a signal $\Delta U$ at output 50 which represents the change in amplitude (A−B) caused by the change $\delta f$ in the oscillation frequency. Signal $\Delta U$ is multiplied in the adapter 51 by a constant, $K/\delta f$. This gives the value and proper sign of the tangent $\Delta U/\delta f$, which represents the amount $$\Delta f_1 = K \cdot \Delta U/\delta f$$

by which the frequency of oscillation $f_0$ should be changed during the next periods $t_3$ and $t_4$ (see FIG. 13, third chart from the top).

Varying the oscillation frequency by the value computed for $\Delta f$ makes it possible to reach the maximum peak for signal U more quickly. In doing this the variations $\Delta f$ used when the impulse force generating frequency is far from the twisting resonance frequency are large variations, and when the difference in the two frequencies becomes smaller the variations used also become smaller. This happens because the smaller the difference between the impulse force generating frequency and the curve peak frequency the smaller the value of the tangent (see FIG. 12).

The analog value $\Delta f_1$ generated by adapter 51 is used to increase the contents, also stored in analog form and which at the point in time considered, correspond to $f_0$, that are stored in storage device 52. This increase is always made at the end of each second period, i.e., at time points $t_2$, $t_4$, $t_6$, etc., on command of the sequencer 31 which passes through connection 53. The contents of storage device 52 over time are displayed in the third chart from the top of FIG. 13. The output signal leaving storage device 52 is sent through addition node 54 and connection 55 to the voltage-frequency converter 32, which converts it into a frequency $f_2$. Frequency $f_2$ is sent, via connection 33, to PID unit 42, where it modulates the frequency which controls, via circuit 10, the oscillations of the impulse force generating electromagnet 9. This frequency is also sent to sequencer 31, where it supplies the basic synchronization for all operations.

By oscillating the system at frequency $f_2$ the new signal $U_3$ will be produced at output 35, and (see FIG. 13) be stored in storage device 45.

Upon command of the sequencer 31, the aforementioned small analog signal $\delta f$ generated by the disturbance generator 57 (whose behaviour is displayed by the broken line shown in the second chart from the top in FIG. 13) is fed through connection 56 to addition node 54. This way, at time $t_3$ (see FIG. 13), the two signals displayed in the second and third charts of FIG. 13 are added to each other to generate a new frequency $f_3$, which is shown in the fourth chart of FIG. 13. This chart shows the behaviour of the frequency available at the output of converter 32 over time. The force which causes the system to oscillate is generated based on this signal. After the oscillation frequency changes new signal $U_4$ will be generated and stored in storage device 46. The signal processing procedure previously described will repeat and a new value $\Delta f_2$ will be determined. Eventually, a new oscillation frequency $f_4$ and a new signal $U_5$ will result and this procedure will be repeated.

The result of the foregoing procedure is that after a few repetitions the frequency corresponding to the peak M of the curve of FIG. 12 will be reached and maintained. The tangent $\Delta U/\delta f$ is 0, the output magnitude is at a maximum, and the oscillating frequency is the twisting resonance frequency $f_{rt}$.

In practice the increments $\delta f$ cannot be made small enough to insure that peak M is approximated without being overshot. The sharp curvature of the top of the actual peak causes, as shown in FIG. 12, the increase $\delta f$ in frequency $f_4$ to result in a new frequency $f_5$ which lies beyond the twisting resonance frequency $f_{rt}$. The effect of the variations $\delta f$ is such that the operating frequency will always fall above or below the twisting resonance frequency $f_{rt}$, with the result that $\Delta U$ will never become equal to zero; instead, the output signal U will always oscillate around the maximum value.

In order to minimize the output error caused by this convergent behaviour, the higher value of the two available output signals (obtained with, and without the disturbance signal $\delta f$ at each cycle of the two integrations performed to search for the peak) is applied to the actual output 58 of the instrument. In other words, the contents of the two storage devices 45 and 46 are sent through connections 59 and 60 to a maximum value selector 61 which delivers the greater of these two values to output 58. This way, even though during the search for the peak some U values may be be lower than the peak value, they will have no influence on the output, but are only used to the end of the search for the twisting resonance frequency.

On the other hand, in order for output 58 to be zero when the flow rate is zero, a signal is subtracted from the selected output 62 at node 63. This subtracted signal physically corresponds to the differential action of the magnetic brakes 15 and 16, and this signal is supplied by a signal generator 64 which is also used for calibrating the instrument.

The above disclosed circuit used for searching for and maintaining the twisting resonance frequency is both simple and quite effective provided the flow rate of the fluid under measurement does not change too quickly.

When there are rapid changes in flow rate conditions may arise which prevent the circuit from operating correctly. One result of this is that until the flow rate reaches a steady state the impulse force generating frequency may not correspond to the twisting resonance frequency.

Figure 14:
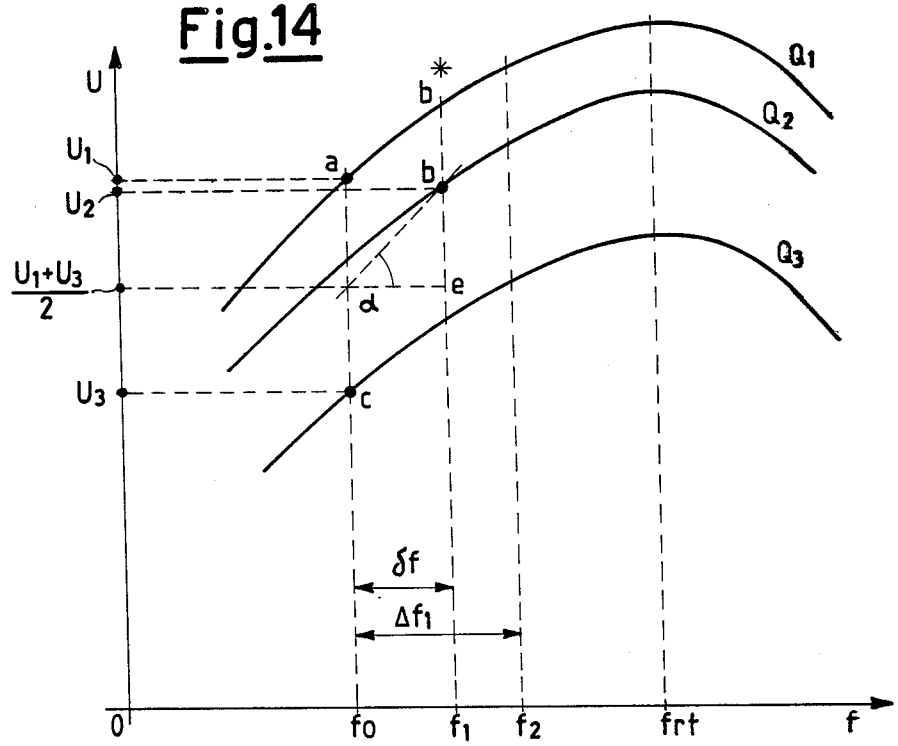
FIG. 14 is a chart showing the correlation curves between the integrated quantity U and the frequency of oscillation f for different flow rate values, as well as the frequency increases which must be supplied in the search for the twisting resonance frequency.

The reasons why an error can occur in processing frequency corrections for quickly changing flow rates can be better understood by considering the case shown in FIG. 14. There, several curves are shown which are characteristic curves for U signals as a function of frequency. These curves represent various flow rates $Q_1$, $Q_2$ and $Q_3$, which are assumed to rapidly follow one another over time.

If for flow rate $Q_1$ the frequency is $f_0$ and the output signal is $U_1$ (the "a" point of the $Q_1$ curve in FIG. 14), when the frequency is increased by $\delta f$, to the new value $f_1$, the magnitude of the new output signal, instead of increasing as it would when the flow rate remains constant (the "b*" point of curve $Q_1$), instead decreases, reaching the value $U_2$. This happens because the flow rate decreased to $Q_2$ (the "b" point of the $Q_2$ curve). The circuit which searches for the resonance frequency calculates for these conditions the correction which is to be made to the frequency, and which has the value $\Delta U \equiv \Delta U_2 - U_1$. When this quantity is negative it causes the frequency to depart from the desired twisting resonance frequency $f_{rt}$.

In order to eliminate this drawback, another aspect of the instant invention is a variant of the already described circuit which makes it possible to locate the twisting resonance frequency even when the flow rate changes rapidly.

Figure 15:
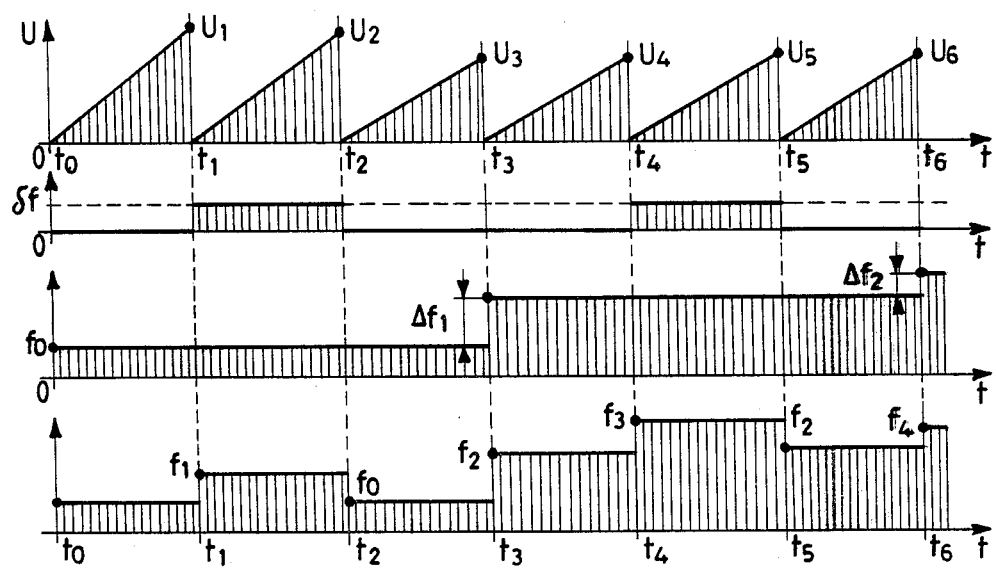
FIG. 15 is a chart showing the behaviour over time of the various parameters necessary when searching for the twisting resonance frequency when the flow rate is variable. These various parameters are correlated with one another.

In this variation of the invention, the cycles analyzed are not the two-period cycles formerly examined, but rather, are three-period cycles; now the analog signal $\delta f$ which is used is no longer that shown in the second chart from the top in FIG. 13, but is instead the signal represented in the second chart from the top in FIG. 15. In other words, the operating frequency is increased by $\delta f$ every third period. The analysis is carried out on three successive values of signal U. Now, signal $U_1$ corresponds to frequency $f_0$, at flow rate $Q_1$ (see FIG. 14), signal $U_2$ is obtained at frequency $f_2 = f_1 + \Delta f$, at flow rate $Q_2$, and signal $U_3$ is obtained by bringing the system's impulse force generating frequency back to its initial value at the cycle's beginning, i.e., to $f_0$ (see the fourth chart in FIG. 15), at which time the flow rate has become $Q_3$ ("d" in FIG. 15).

It should be recalled that the values $U_1$ and $U_3$, obtained at the same frequency, are very different from each other, although they would be the same if the flow rate had reached a steady state. The method of the present invention consists of applying a correction $f_1$ to the basic frequency $f_0$ which correction is not proportional to the difference between the first ($U_1$) and second ($U_2$) measured values, but rather, is proportional to the difference between the second measured value $U_2$ and the average of the values $U_1$ and $U_3$, as computed at the same frequency $f_0$, and flow rates $Q_1$ and $Q_3$. In other words the approximate value of the actual tangent to the curve corresponding to the flow rate $Q_2$ is represented by the tangent of angle bde. This value is calculated as (see FIG. 14):

$$\tan\alpha \simeq \frac{be}{\delta f} = \frac{U_2 - (U_1 + U_3)/2}{\delta f}$$

It should be noted that this approximation improves as the changes in flow rate become more regular. When the curves at flow rates $Q_1$, $Q_2$ and $Q_3$ are equidistant it reaches the correct value.

In the case of irregular variations as shown in FIG. 14, the above said approximate value still provides the correct value of the tangent. Correction factor $\Delta f_1$ is generated and applied to the oscillation frequency which approaches the resonance peak, thereby locating the twisting resonance frequency $f_{rt}$.

Figure 9:
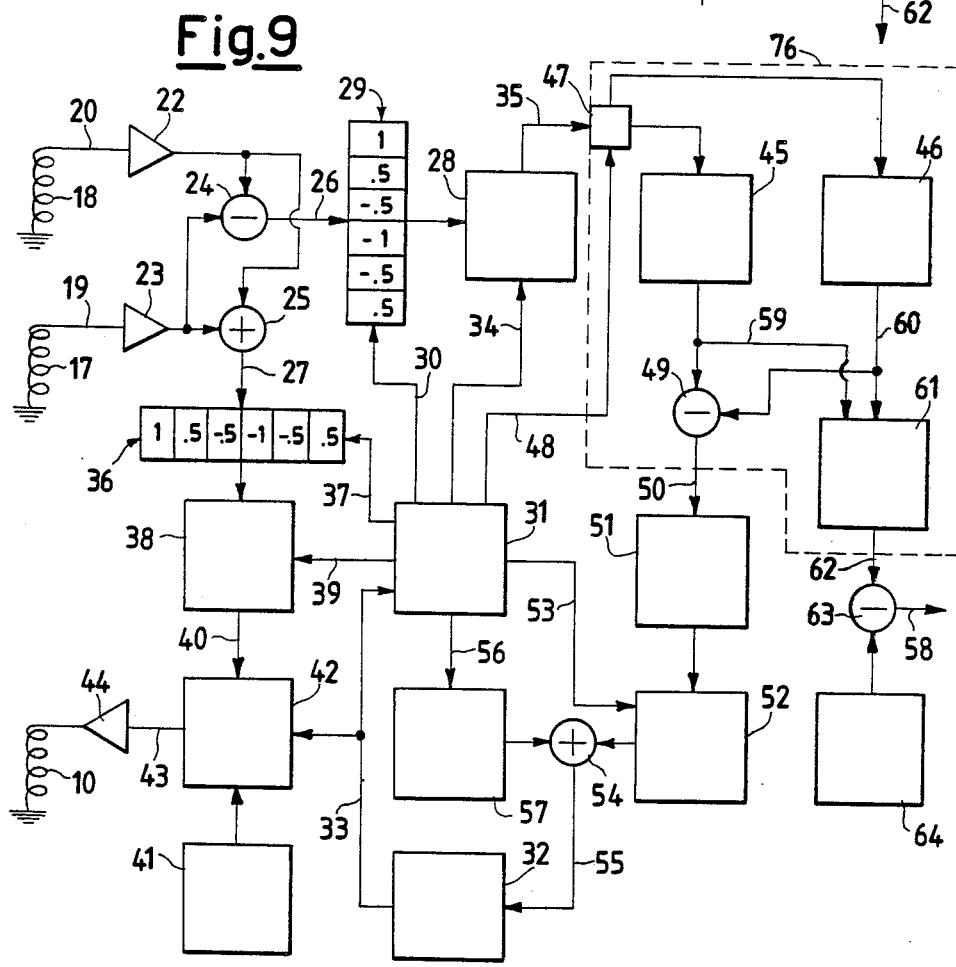
FIG. 9 shows, in block diagram form, the electronic control circuits used in a flowmeter according to the present invention.

Insofar as the electronic circuitry employed in the instant invention is concerned, this latest embodiment consists of replacing the portion 76 of the circuitry shown in FIG. 9 with the circuitry shown in FIG. 10, wherein a third storage device 77 is added. This storage device 77 is able to store the signal $U_3$ received through the three-way switch 47 which is available at the output of integrator 28 during the third period of the cycle.

The two storage devices 45 and 77 are then connected to the addition node 78, producing the value $(U_1 + U_3)$ at output 79. This value is then divided in divider 80 by 2, providing the average value $(U_1 + U_3)/2$ at output 81 which can be used for computing the approximate tangent by means of the difference node 49 and of the adapter 51, for the basic circuit already disclosed.

As in the basic circuit, a maximum value selector 81 is provided. It selects the largest of the U values sent to it from the three storage devices 45, 46 and 77.

FIG. 2 shows another embodiment of a flowmeter according to the present invention. This flowmeter includes an individual rectilinear pipe 65 through which the fluid flows in the direction of the arrows 1, and which is made to oscillate at the frequency corresponding to the frequency of resonance with its second harmonic 3 (see specifically FIG. 8), by the impulse force generating electromagnet 9 acting on the middle of the pipe.

Among the advantages of this embodiment are reductions in pressure drops, costs and structural complications. To help in centering and aligning oscillating pipe 65 a second pipe 66 is placed outside of and coaxial with pipe 65. The outer pipe 66 joins the two connection flanges 67 and 68, and supports the impulse force generating electromagnet 9 and the two electromagnetic brakes 15 and 16, which, respectively, are equipped with motion sensors B, 17, and A, 18. These sensors have the same structure and function as the corresponding sensors used for the "U"-shaped pipe 4.

This type of flowmeter is particularly suitable for large pipes. Because considerable power may be needed to produce the impulse force a device was employed in the present invention which considerably reduces the needed power, and also the size of the impulse force generating electromagnet.

This energy saving device connects the external pipe 66 to the internal pipe 65 at a point along the axis of impulse force generating electromagnet 9 by an elastic metal membrane 69. This elastic component is capable of increasing the system's overall elastic constant (formed by the pipe and its mounts), so as to increase the value of the resonance frequency with the first harmonic (equivalent to flexural resonance oscillation). In fact, because this device is positioned exactly at the center of the pipe, which is the node 70 for secondary harmonic oscillations (equivalent to the twisting resonance oscillation) (see FIG. 8), it does not change the resonance frequency of the second harmonic, although the first harmonic is modified. By properly selecting the membrane's elastic constant, it is possible to make the resonance frequency for the pipe's first harmonic closely approach the resonance frequency of the second harmonic while still allowing the motion to be adjusted to search for the resonance frequency corresponding to the second harmonic. The necessary impulse force generating power will be much lower because the pipe already oscillates at a frequency that is near its own spontaneous flexural resonance frequency, which corresponds to the first harmonic.

Finally, another advantage of using a rectilinear oscillating pipe is that the flowmeter can be made immune to seismic disturbances without requiring elastic supports. If the instrument can be supported by connection flanges 67 and 68, with which it does not interact, and if it has been properly dimensioned, the external pipe can oscillate in the opposite direction as the inner pipe without any flange rotation. For this to happen it is enough that the stiffnesses of the internal oscillating pipe and the external supporting pipe, to which the magnetic brakes and the impulse force generating electromagnet are fastened, be related to one another by a ratio proportional to that of their respective masses.

When a system built in this manner is forced to oscillate at a frequency higher than that of either of the two pipes, the two pipes' oscillations will take place with opposite phase because the flexural torques of the two pipes, which are equal, will cancel one another out, preventing rotation of the flanges. Furthermore, because the two masses move in opposite phase, the system's barycenter remains practically stationary, and there will be no interference with the external environment. This pipe configuration is limited by the match of the external mass to the mass of the fluid under measurement; when the latter changes to a considerable extent, there will be interactions with the system's oscillations and therefore the device must be suitably constructed to control these interactions.

Conveniently, these complications can be avoided by simply duplicating the pipe and tube and causing them to oscillate in opposite phase, at a frequency always coincident with the second harmonic. Although this increases the costs and the structural complexity of the flowmeter, it results in a measurement system which is insensitive both to any changes in the mass of fluid, and to the geometry of the connection pipes.

Figure 16:
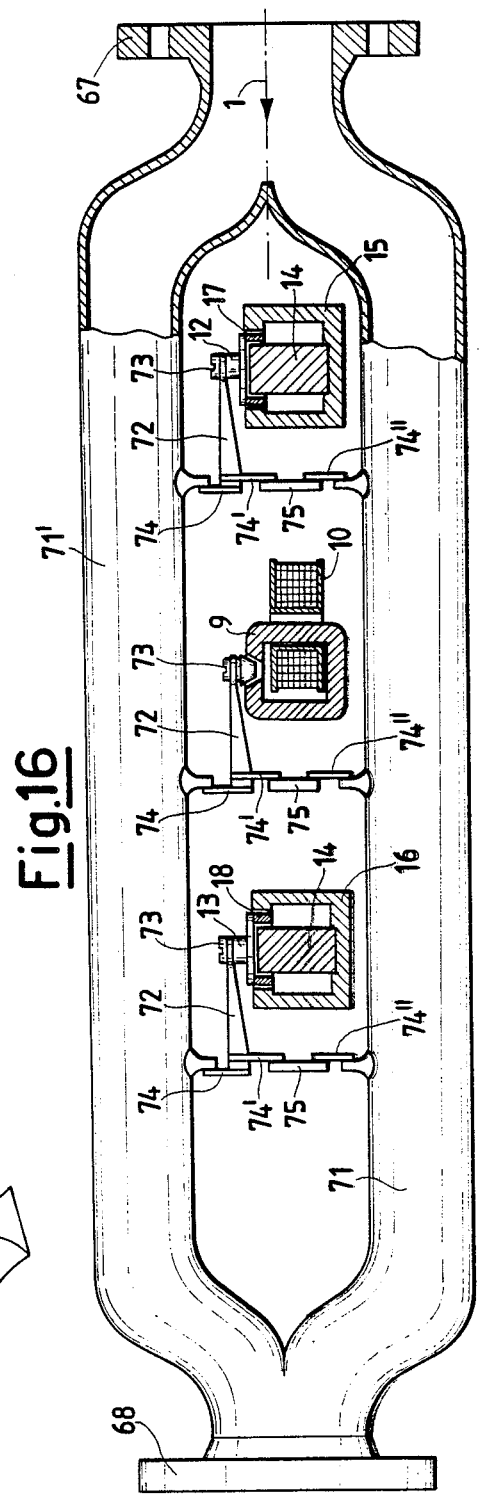
FIG. 16 shows a double rectilinear pipe flowmeter which operates according to the teachings of the present invention.
Figure 10:
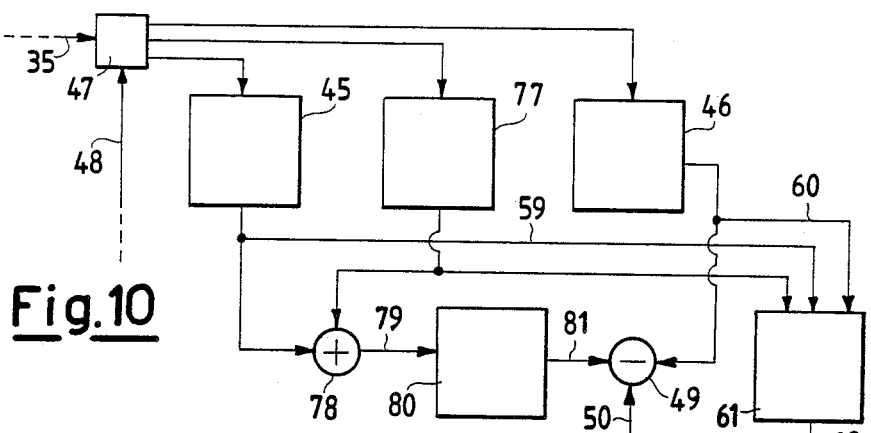

FIG. 16 shows another type of flowmeter according to the invention. This embodiment of the invention uses double rectilinear pipes 71 and 71', and adopts an original solution for the assemblage of both the magnetic brakes 15 and 16, and the impulse force generating electromagnet 9.

This embodiment offers the advantages of doubling the strength of the output signal, reducing the overall dimensions, without affecting the functioning of either the sensor-brake assemblies or the impulse force generating electromagnet. This is done by increasing these devices' lever arms and lightening the moving parts by holding the magnetic elements stationary and not joining them to an oscillating support.

Figure 17:
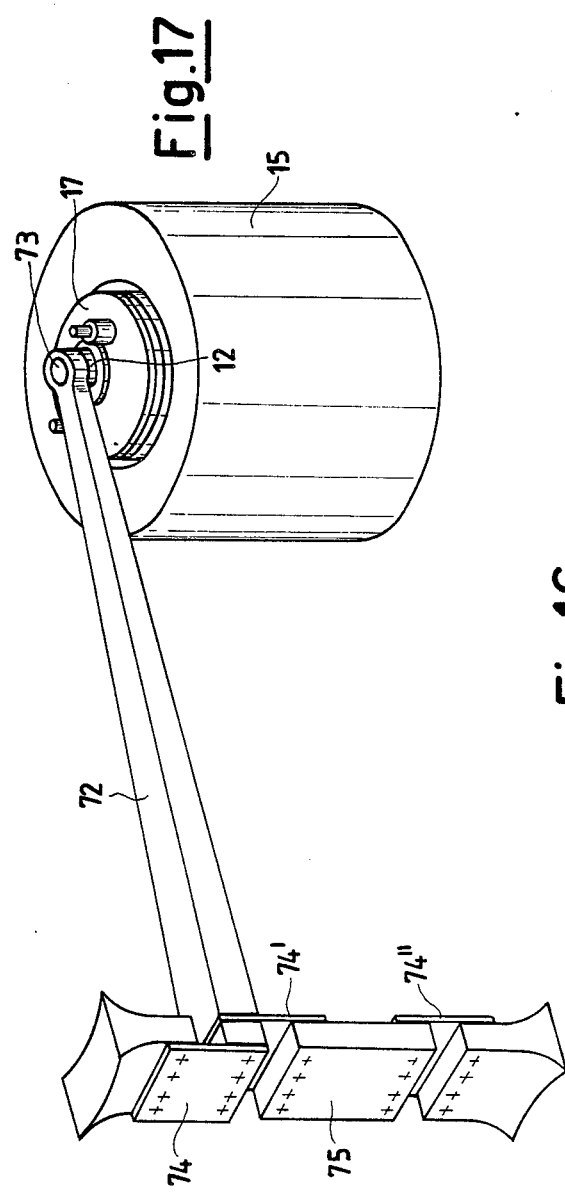
FIG. 17 is an enlarged perspective view of part of the flowstat shown in FIG. 16.

As can be better seen in FIG. 17, the support for the three magnetic units consists of a lever 72 connected at one end 73 to the movable member of the electromagnet or brake, and at the other end to both upper pipe 71' and lower pipe 71. The connections to the pipes are made through elastic blade 74 and the two elastic blades 74' and 74". The elastic blades are connected to one another by stiffening plate 75 and the two sets of blades 74, 74' and 74", are located close to each other.

The amplification of the motion and the resulting forces is therefore proportional to the ratio of the length of the lever 72 and the distance between the two sets of elastic blades. These blades support the lever, while the motionless bodies of brakes 15 and 16, and electromagnet 9 can be mounted on a separate stationary support.

This system makes it possible to achieve a hundredfold signal amplification while allowing a considerable reduction in the size of the magnetic units without affecting their action.

We claim:

1. A process for measuring the mass flow-rate of a fluid, comprising: making the fluid to be measured flow inside a pipe fastened at its ends to a support; making the pipe oscillate at a certain frequency with an amplitude controlled by an impulse force generating device wherein when the pipe is made to oscillate at exactly its twisting resonance frequency; measuring the deformations of the pipe caused by the Coriolis forces; counteracting the oscillations of the pipe with a plurality of brakes whose braking force is proportional to the speed at which the pipe shifts, said braking force being larger than the effect of the Coriolis forces; detecting the shifts of the pipe at two points which are symmetrically located relative to the pipe's center, these points being located where the largest twisting deformations occur; and determining, in order to measure the mass flow rate, the difference in the amplitudes of said two shifts, with the preliminary removal, by means of filtering, of any disturbances.

2. A process according to claim 1, characterized in that the brakes which damp the oscillations of the pipe exert a larger braking force at the fluid inlet side of the pipe.

* * * * *